Jan. 30, 1962 J. E. AUFFENORDE ET AL 3,019,136
TREATING GLASS SHEETS
Filed March 5, 1958
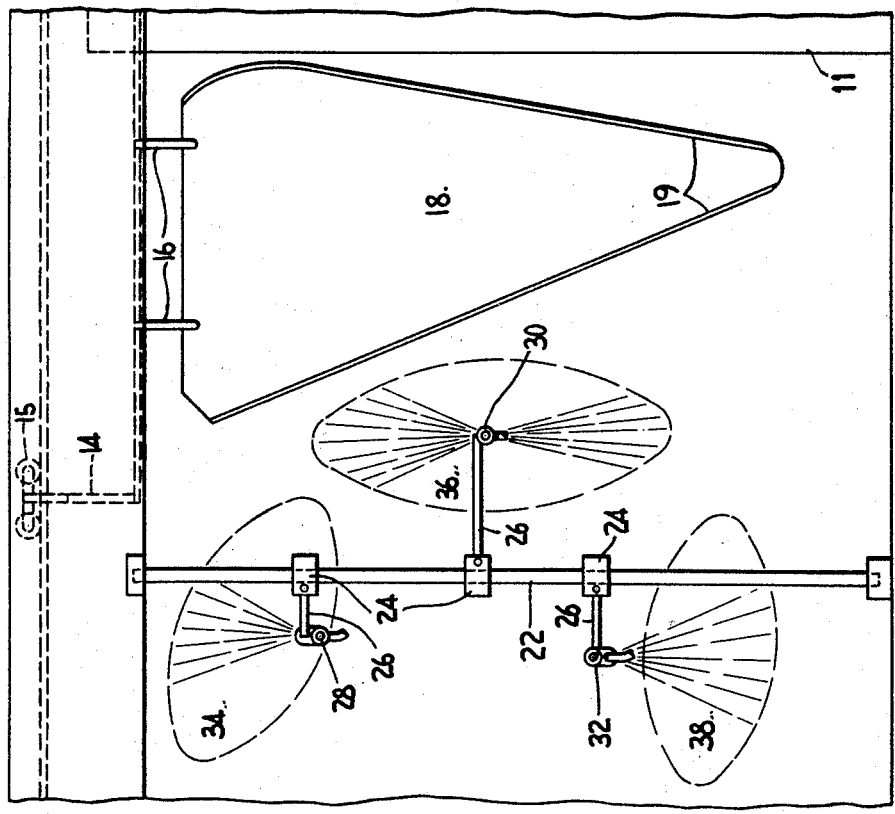
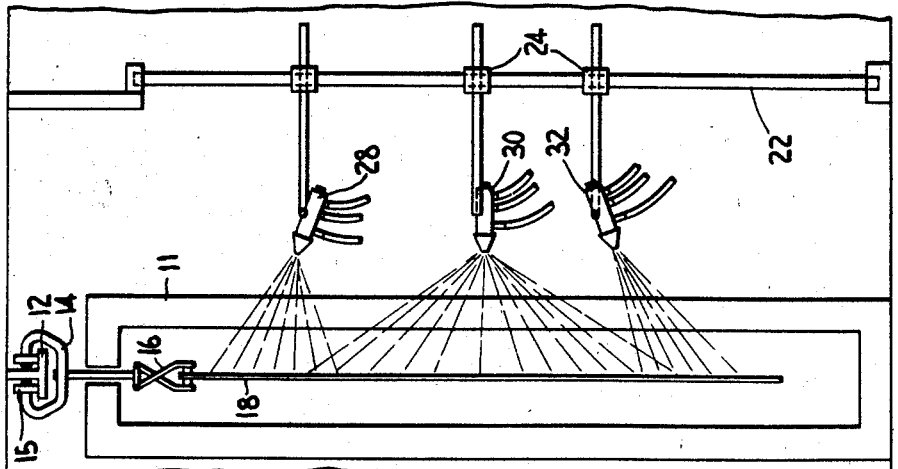
INVENTORS
JAMES E. AUFFENORDE &
HUGH P. PENONE
BY
Oscark Spencer
ATTORNEY

United States Patent Office 3,019,136
Patented Jan. 30, 1962

REissued Apr. 27, 1965
RE. 25,767

3,019,136
TREATING GLASS SHEETS
James E. Auffenorde, Brackenridge, and Hugh P. Penone, Leechburg, Pa., assignors to Pittsburgh Plate Glass Company, Allegheny County, Pa., a corporation of Pennsylvania
Filed Mar. 5, 1958, Ser. No. 719,362
7 Claims. (Cl. 117—211)

This invention relates to treating glass sheets and is specifically directed to a novel method and apparatus for providing a metal oxide coating on an elongated sheet of transparent glass or other refractory material. The coating may either be of the transparent electroconductive type or a partially transparent heat absorbing material. The size of the sheet coated is so large that it is necessary to employ a plurality of spray guns.

It is known that transparent electroconductive films may be deposited upon glass by applying stannic chloride to the surface of glass heated above 400° F., preferably 850° to 1350° F. Films of superior conductivity may be produced according to methods described in U.S. Patent No. 2,648,754 of William O. Lytle. These films or coatings are obtained by spraying plate, window, or other glass base while it is heated to a temperature above 400° F. but below the temperature at which the glass becomes molten with a dispersion of a hydrolyzable metal salt such as tin tetrachloride or other tin salt in aqueous or other solution or in vapor state, usually in the presence of certain agents, such as methanol, phenylhydrazine hydrochloride, etc. The films thus obtained are of unknown composition, but appear to contain a preponderant amount, usually about 97 to 99 percent or more, of a tin oxide, together with certain impurities including metallic tin, carbon, silica, sodium, chlorine and other impurities, depending upon the composition of the applied tin-containing solution. These films have a thickness of about 50 to 800 millimicrons, are transparent and have the unusual characteristic of being electroconductive, the particular degree of electroconductvity being dependent to a great extent upon the nature of the process of depositing the films. Tin oxide films, deposited in accordance with the process described in the above identified Lytle patent, have a resistance below 500 ohms per unit square, a specific resistance below about 0.01 ohm-centimeter and a haze factor below about 2.5 percent.

Articles described in the above identified patent are useful in many fields and have been found to be particularly useful as windshields or viewing closures in automobiles, aircraft, trains and similar motor vehicles. In such use, the coating is placed in series with a source of electric potential and is used as a heating element in order to heat the closure and thus prevent deposition of ice, fog, moisture, etc., thereupon.

The articles herein contemplated comprise a glass sheet, usually of plate glass or other flat glass structure (including bent or curved glass structures) provided with conductive metal strips suitable for bus bars.

The present invention is especially concerned with the filming of elongated glass sheets having a dimension in excess of that capable of being covered by a single spray. Prior to the present invention, when multiple sprays were applied to elongated glass sheets, the resulting coatings were characterized by bands of relatively thickly filmed areas. The only solution the prior art found for avoiding the bands of thickly coated areas was to utilize a single spray to cover a portion only of the glass. The unfilmed portions of the glass were almost as susceptible to fogging and frosting as uncoated glass sheets, thus resulting in an unsatisfactory solution to the problem. The applicants, after considerable study of this problem, theorized that the band formation resulted from the mutual reinforcement of sprays applied simultaneously along their boundary and set out to avoid this defect.

The present invention minimizes the formation of these bands of thickly filmed areas by applying along diverging axes a plurality of distinct sprays of a metal oxide film forming material to intersect localized portions of a heated glass sheet surface to be coated. According to a specific embodiment of the present invention, the glass sheets are heated to a proper elevated temperature and then moved while oriented properly through a succession of discrete, non-intermingling sprays, which impinge along parallel paths of relative movement between different portions of the heated glass sheet and the sprays. The paths of intersection of the sprays with the different portions of the glass sheet combine to cover the entire sheet with a continuous coating after the sheet has been translated through all of the diverging sprays.

In a particular embodiment involving the use of three sprays, a glass sheet is supported with its longitudinal dimension oriented vertically and first exposed to a spray directed substantially normally to the surface of the glass sheet to be coated and aligned with the central portion of the sheet, followed by exposure to discrete diverging sprays aligned with the upper and lower portions of the glass sheet. In providing a sheet of non-uniform width with a coating of substantially uniform heat generation throughout its extent, the rate of applying an individual spray may differ from that of at least one other spray to provide a different thickness of coating on different portions of the glass sheet as desired. Furthermore, the composition of the hydrolyzable metal salt dispersion of an individual spray may differ from that of at least one other spray in order to further control the local requirement for the film characteristics.

The invention may be understood more thoroughly after a detailed study of a specific apparatus constructed according to the teachings of the present invention.

In the drawings which form part of the present disclosure and wherein like reference numbers refer to like structural elements:

FIGURE 1 is an end elevation looking in one direction toward an embodiment of apparatus conforming to the present invention; and FIGURE 2 is a side elevation of the apparatus shown in FIGURE 1 depicting additionally the configuration of the various sprays along the path of movement of a glass sheet to be coated.

Referring to the drawings, reference number 11 refers to a furnace wherein glass sheets are heated. Since the furnace is of well known construction in this art only the end portion is disclosed. A monorail 12 in the form of an inverted T serves to support a glass sheet supporting carriage 14 provided with wheels 15 which ride on the monorail. The carriage supports a plurality of tongs 16 which grip the upper edge of a glass sheet 18 provided with bus bars 19 along its opposed longitudinal edges. The glass sheet 18 is of irregular outline and is shown supported with its lengthwise dimension oriented substantially vertically.

Beyond the furnace 11 is a spraying station shown generally by reference number 20. Spraying station 20 comprises a spray gun support post 22 which extends vertically between a floor support and a roof support to one side of the path of movement defined by the monorail 12. A plurality of adjustable collars 24 are slidably and rotatably mounted relative to the vertical spray gun support post 22. Spray gun support rods 26 are adjustably secured to each of the rotatably and axially adjustable collars 24. An upper spray gun 28, a middle spray gun 30 and a lower spray gun 32 are attached to an extremity of each of the spray gun support rods 26.

The middle spray gun 30 is adjusted to apply its spray about a central axis that is substantially normal to the surface of the glass sheet 18 that is supported in a vertical plane from the tongs 16. The spray gun support rod 26 for the middle spray gun 30 is oriented to extend toward the exit of the furnace 11 so that the spray from middle spray gun 30 impinges on an area 36 of the central portion of the glass sheet 18 as the latter moves from right to left through the spraying station 20 at a constant velocity in the view depicted in FIGURE 2. Thus, the heated glass sheet 18 is first intersected by the spray 36 in its central region.

Upper spray gun 28 is tilted slightly upwardly and its support rod 26 extends rearwardly of the vertical support post 22 so that the area of spray 34 from upper spray gun 28 intersects the upper portion of the glass sheet 18 and the spray impinging on the upper portion is directed away from the spray impinging on the central portion, thus minimizing the formation of bands in the region of overlap between the upper spray 34 and the central spray 36.

Similarly, the lower spray gun 32 is adjusted to provide a spray about an axis that diverges downwardly from the axis provided by middle spray gun 30. Lower spray gun 32 is mounted rearwardly of the vertical support post 22 so that its spray defines an area 38 in the bottom portion of the surface of glass sheet 18 to be coated that is directed away from the area 36 provided by the spray of the middle spray gun 30 and the area 34 provided by the upper spray gun 28.

Furthermore, it is noted that each spray applied to the glass sheet is discrete from the other sprays in the plane defined by the path of movement of the glass sheet surface to be coated. Therefore, the mutual reinforcement of sprays before the sprays impinge on the glass sheet, which caused bands of thickened film to form using prior art techniques are absent from the present invention. Surprisingly, the thickened bands are almost unobservable even in cases where there is a slight overlap of the portions covered by different sprays. The reason for this phenomenon is not understood exactly, but is believed to be associated with the absence of mutual reinforcement by virtue of the convergence of the extremities of spaced converging or parallel sprays relative to each other before the spray impinges on the glass, thus causing the sprays to thicken at their mutual boundaries. In other words, the discrete sprays applied by the technique of the present invention do not intermingle with each other before they impinge on the glass.

Furthermore, it is desirable that sprays used to coat adjacent portions of the heated glass sheet transverse to the path of relative movement between the glass and the sprays be offset with respect to each other along the path of relative movement. This offset relation is made desirable by the fact that the periphery of each individual spray diverges slightly from its central axis of dispensing. A small proportion of the periphery of each spray bounces outside the area defined by the spray after striking the glass. Thus, if two sprays directed to adjacent areas are not offset with respect to each other along the path of relative movement, the bounced portions of the adjacent margins of adjacent sprays reinforce each other to produce an observable band depicting a thickened area. Surprisingly, the amount of thickening due to the overlap of the peripheries of offset, discrete sprays is not sufficient to be observable by the human eye because the thickening is relatively slight and spread over a relatively wide area when offset sprays are employed, whereas the simultaneously opposing bouncing peripheral portions of aligned sprays form a relatively thick band concentrated in a relatively thin area.

*Example 1*

Glass sheets provided with ceramic silver bus bars 19 along their longitudinal edges and having an irregular outline similar to that depicted for the glass sheet 18 of FIGURE 2 were oriented vertically and each sheet heated for approximately 3.5 minutes in a furnace. This caused the temperature of the glass sheet surfaces to reach a temperature approximately 1220° F. Immediately after heating, each glass sheet was moved past a battery of three spray guns at a speed of approximately 8 to 10 inches per second. The nozzles of the spray guns were set to be in a plane about 14 inches from the path of movement of the glass sheet. The three spray guns were adjusted in the relative positions and orientations as depicted in FIGURES 1 and 2, the middle spray gun being directed substantially horizontally to strike the central portion of the glass sheet at an angle of substantially 90° to the surface of the heated sheet and the upper and lower spray guns oriented to apply sprays about axes diverging from that of the middle spray gun. The additional spray guns were located beyond the location of the central spray gun along the path of movement of the heated glass sheet.

The spraying composition used for the top and middle guns consisted of:

| | | |
|---|---|---|
| Stannic chloride | grams | 20,430 |
| Phenylhydrazine hydrochloride | do | 639 |
| An aqueous solution of hydrofluoric acid containing about 48 percent by weight of hydrofluoric acid | grams | 134 |
| Distilled water | milliliters | 7,056 |
| Dioctyl sodium sulfosuccinate solution | do | 918 |
| Methanol | do | 2,250 |

The spraying solution for the bottom gun consisted of all the ingredients listed above except that the 134 grams of an aqueous solution of HF containing about 48 percent by weight of HF were omitted. Therefore, the film formed by the spray applied by the bottom spray gun had a higher resistivity than those formed by the upper and middle sprays.

The solution was applied to the top gun at approximately 210 cubic centimeters per minute with an air nozzle pressure of 50 pounds per square inch. The solution in the middle gun was applied at a rate of approximately 70 cubic centimeters per minute with an air nozzle pressure of 50 pounds per square inch, while the solution in the bottom gun was applied at a rate of approximately 60 cubic centimeters per inch with an air nozzle pressure of 50 pounds per square inch.

The film resulting on the glass sheet was free from the bands that had characterized earlier films formed from a plurality of spray guns directing their sprays along parallel axes. Furthermore, the resistivity of the film formed was of such value that the resistance between opposing portions of a bus bar did not vary considerably so that a desirable uniform heat pattern resulted when a potential difference was impressed upon bus bars 19.

It will be understood that numerous variations of the above described embodiment is within the scope of the present invention. For example, a panel may be moved through the various sprays at a non-uniform forward speed in order to obtain coatings having a thickness variation determined by the variation in rate of passage of the panel through the spray. Moreover, the sheet may be oriented in a plane other than the vertical while causing relative motion between it and discrete, divergent sprays directed thereto at any angle. For example, the sheet may be disposed horizontally and the sprays directed in substantially vertical or oblique planes upwardly or downwardly, and the divergent sprays directed along axes at acute angles to those of the other sprays. Furthermore, the relative movement may be reciprocation as well as translation in a forwardly direction. In addition, the sequence of filming the various portions of the heated glass sheet may be varied to first film the end portions, then the central portion or any other sequence of filming that may be most suitable for a particular pattern.

In general, the panel to be coated comprises ordinary window or plate glass which is composed of lime-soda glass. However, other glass or glass-like refractory materials which do not melt or fuse at 1250° F. may be provided with coatings according to the present invention. For example, the base to be coated may be of borosilicate glass, china, porcelain, mica, phosphate glass, stone, lead-X-ray glass, tungsten carbide, aluminum oxide, marble, tungsten, etc.

While the above example teaches a particular method of producing a transparent, electroconductive film of tin oxide film, it is well known that various metal oxide films such as the oxides of zinc, cadmium, aluminum, indium, thallium, silicon, titanium, germanium, zirconium, cobalt, lead, thorium, columbium, antimony, tantaium, copper, vanadium, bismuth, chromium, molybdenum, tungsten, manganese, iron, nickel and of various mixtures of these metals too numerous to mention may also be produced by utilizing any hydrolyzable compound of the above recited metals or mixtures thereof which are or can be in fluid form, that is the vapor or an atomized solution of the compound.

Inorganic compounds which are suitable are for the most part salts of inorganic acids and include, for example, the chlorides, which are generally most suitable, as well as iodides, bromides, fluorides, sulfates, nitrates, and the like. Furthermore, organic salts and compounds of the recited metals which are available and which can be dissolved or diluted if not with water, then with an organic solvent, such as alcohol, toluene, benzene or other miscible liquid, are also suitable. Such compounds may include open chain compounds such as acetates, lactates, oleates, oxalates, salicylates, stearates, tartrates, and the like, and aromatic compounds such as the benzoates, phenolates, phenolsulfonates, and so forth.

Although the present invention has been described with reference to the specific details of a specific embodiment, it is not intended that such embodiment shall be regarded as limitations upon the scope of the invention except insofar as included in the accompanying claims.

What is claimed is:

1. The improvement in coating refractory sheets of irregular outline with a continuous film containing metal oxide by heating a sheet to an elevated temperature above 400° F. and below the temperature at which the sheet becomes molten and spraying a dispersion of a hydrolyzable metal compound onto a surface of the heated sheet while providing relative movement between the sheet and the spray which comprises applying a plurality of discrete, sprays of metal oxide film forming material along divergent axes to intersect localized portions of the sheet surface to be coated along parallel paths of relative movement, the parallel paths of intersection combining to cover the entire sheet after the different portions of the sheet have been exposed to the divergent sprays from edge to edge along the paths of relative movement, each spray intersecting a portion of the surface of said heated sheet without intermingling with another spray prior to contacting said surface.

2. The improvement according to claim 1, further including orienting the sheet of irregular outline so that its lengthwise dimension is fixed in one direction while the sheet is being heated, and translating the heated oriented sheet past the discrete, divergent sprays in a direction transverse to said first direction.

3. The improvement according to claim 1, wherein the sheet is oriented in a vertical plane and the sprays are directed about divergent substantially horizontal axes.

4. The improvement according to claim 1, wherein the rate of spraying an individual spray on a relatively wide portion of the sprayed sheet is greater than that of spraying at least one other spray on a relatively narrow portion of the sprayed sheet.

5. The improvement according to claim 1, wherein the composition of the hydrolyzable metal compound dispersion of an individual spray differs from that of at least one other spray so that the spray impinging onto a relatively wide portion of the sprayed sheet forms a metal oxide film of relatively high electroconductivity and the spray impinging onto a relatively narrow portion of the sprayed sheet forms a metal oxide film of relatively low electroconductivity.

6. The improvement according to claim 1, wherein the sheet is oriented in a substantially vertical plane and the sprays are directed about divergent axes from a plane spaced from and substantially parallel to the vertical plane.

7. The improvement according to claim 1, wherein the sheet is oriented in a substantially horizontal plane, and the sprays are directed about divergent axes from a plane spaced from and substantially parallel to the horizontal plane.

References Cited in the file of this patent

UNITED STATES PATENTS

| | | |
|---|---|---|
| 2,557,983 | Linder | June 26, 1951 |
| 2,698,261 | Gaiser | Dec. 28, 1954 |
| 2,703,767 | Young | Mar. 8, 1955 |
| 2,724,658 | Lytle | Nov. 22, 1955 |
| 2,811,130 | Friderici | Oct. 29, 1957 |
| 2,839,425 | Juvinall | June 17, 1958 |

FOREIGN PATENTS

| | | |
|---|---|---|
| 728,887 | Great Britain | Apr. 27, 1955 |